United States Patent [19]
Khodov et al.

[11] Patent Number: 5,429,661
[45] Date of Patent: Jul. 4, 1995

[54] METHOD OF RECOVERING LEAD FROM RECYCABLE LEAD-CONTAINING RAW MATERIAL

[75] Inventors: Nikolai V. Khodov; Oleg K. Kuznetsov, both of Vladikavkaz, Russian Federation

[73] Assignee: Nikolai Vladimirovich Khodov, Vladikavkaz, Russian Federation

[21] Appl. No.: 67,225

[22] Filed: May 26, 1993

[30] Foreign Application Priority Data

May 27, 1991 [RU] Russian Federation ............ 5038646

[51] Int. Cl.$^6$ ............................................. C22B 3/12
[52] U.S. Cl. ........................................ 75/743; 75/432; 204/104
[58] Field of Search .................... 75/432, 743; 204/104

[56] References Cited

U.S. PATENT DOCUMENTS 5,106,466  4/1992  Olper et al. .................... 204/104
5,248,342  9/1993  Montgomery et al. .............. 75/743

*Primary Examiner*—Melvyn J. Andrews
*Attorney, Agent, or Firm*—Ladas & Parry

[57] ABSTRACT

A method of recovering lead is proposed, wherein preliminarily crushed recycable raw material composed of spent lead-sulphuric acid storage batteries is subjected to treatment with an alkaline solution, as a result of which metallic lead, taken out of the process, and pulp, to be subjected to mechanical separation, are obtained. As a result of the separation, a lead-containing (as inclusions) polymer material and a suspension, which is a mixture of a sodium sulfate solution having lead oxide particles therein, are obtained. The suspension is separated, as a result of which lead oxides are taken out of the process, while the sodium sulfate solution is subjected to electrochemical treatment, as a result of which sulphuric acid and an alkaline solution are obtained, the alkaline solution being fed for treatment of the lead-containing (as inclusions) polymer material. As a result the amount of lead in the polymer material is reduced and an alkaline solution is obtained comprising sodium sulfate and sodium plumbate and is fed for treatment of the recyclable raw material.

4 Claims, 1 Drawing Sheet

METHOD OF RECOVERING LEAD FROM RECYCABLE LEAD-CONTAINING RAW MATERIAL

FIELD OF THE INVENTION

The present invention relates to non-ferrous metallurgy, more exactly to a method of recovering lead from recycable lead-containing raw material.

The present invention can be used to the greatest effect in the processing of scrap of lead-sulphuric acid storage batteries.

BACKGROUND OF THE INVENTION

At the present time the problem of processing and utilizing lead-containing recycable raw material to obtain the maximum recovery of lead is timely, even more so since the percentage of recycable raw material used in the production of lead increases from year to year. An increase in the amount of recovered lead reduces its emission into the environment with gaseous products during the pyrometallurgical method of lead production and with drain water during the hydrometallurgical method of lead production.

A method of recovering lead from a recycable lead-containing raw material is known, reducing the contamination of the environment and increasing the degree of the recovery, which is taught in BR DE 3612491 and includes the following steps.

At first the recycable lead-containing raw material, which is presumed to mean the scrap of lead-sulphuric acid storage batteries, is crushed. Then the aforementioned raw material is separated into fractions—metallized lead, an oxide-sulfate active mass and a polymer material.

The polymer material fraction can comprise lead in an amount up to 6.0% by weight which is present in the fraction as PbO, $PbO_2$ and $PbSO_4$.

Then the metallized lead and polymer material fraction are taken out of the process, and the oxide-sulfate fraction is subjected to treatment with a solution comprising $Na^+$, $OH^-$, $CO_3^{2-}$, and $SO_4^{2-}$ ions with pH>10, in two steps. During the first step partial desulphurization of the oxide-sulfate fraction takes place in a suspension comprising a solution of sodium sulfate $Na_2SO_4$ with pH=6–7, resulting in the absence of lead in the solution, and solid PbO, $PbO_2$, $PbSO_4$ particles. Then the obtained suspension is filtered. As a result a solution of sodium sulfate $Na_2SO_4$ and solid PbO, $PbO_2$ and $PbSO_4$ particles are obtained. After the first step the $Na_2SO_4$ solution is subjected to evaporation and an anhydrous $Na_2SO_4$ is obtained, which is taken out of the process.

The final desulphurization of the oxide-sulfate fraction takes place during the second step by treating the solid particles of PbO, $PbO_2$ and $PbSO_4$ with a solution of NaOH, in particular sulphur as an $SO_4^{2-}$ ion passes into the alkaline solution, while the solid PbO and $PbO_2$ particles are taken out of the process during the reduction smelting in the presence of coke.

Now $Na^+$, $SO_4^{2-}$, $/Pb(OH)_4/^{2-}$, $OH^-$ ions are present in the alkaline solution. The aforementioned solution is fed for carbonization, in particular, flue gas comprising $CO_2$ is blown through the solution. A suspension is obtained as a result of the carbonization, which is a mixture of a liquid phase comprising $Na^+$, $OH^-$, $CO_3^{2-}$, $SO_4^{2-}$ ions with pH>10 and solid particles of lead carbonate. The suspension is filtered, after which the lead carbonate is removed from the process, while the liquid phase with the $Na^+$, $OH^-$, $CO_3^{2-}$, $SO_4^{2-}$ ions is fed to the first step of desulphurization of the oxide-sulfate fraction.

The aforementioned steps of the known method resulted in an increase in the degree of recovery of lead during the reduction smelting of the oxide-sulfate fraction by reducing the amount of the lead sulfide PbS therein which passes into slag. Due to this the emission of sulphur into the environment as sulphur dioxide $SO_2$ is reduced. A reduction of the contamination of the environment was also due to the transition of the $SO_4^{2-}$ ion from the oxide-sulfate fraction of the initial raw material into the $Na_2SO_4$ solution and evaporation of the latter, as a result of which the solid $Na_2SO_4$ fraction becomes a marketable product. As a result the efflux of the $Na_2SO_4$ solution into drain waters is prevented.

During the realization of the known method the scarce agent NaOH is used, which is removed from the process as $Na_2SO_4$, making the recovery of lead more expensive. Furthermore, substantial power consumption is necessary in the realization of the method for the production of anhydrous $Na_2SO_4$, which also makes the recovery of lead more expensive. As a result of the aforementioned steps realizing the method, the degree of recovery of the lead is relatively low because of its loss together with the polymer material fraction taken out of the process. Furthermore, the metallized lead taken out of the process comprises some amount of the oxide-sulfate fraction, which remained therein after the separation. During subsequent metallurgical processing of the metallized lead, this reduces the recovery of lead into a marketable product by 1% due to its loss in the slag.

SUMMARY OF THE INVENTION

An object of the present invention is to reduce the material and energetic consumption during the recovery of lead from recycable raw material without contamination of the environment.

Another object of the present invention is to increase the degree of recovery of lead from recycable raw material due to more complete treatment of its metallized and polymer material fractions.

In accordance with the foregoing and other objects the concept of the present invention is that in a method of recovering lead from a lead-containing raw material including treating a preliminarily crushed recycable lead-containing raw material with an alkaline solution, obtaining thereby metallic lead, which is taken out of the process, and pulp, consisting of a liquid phase—a solution of sodium sulfate, and a solid phase including lead oxides and a polymer material, subjecting the pulp to mechanical separation, obtaining thereby a lead-containing polymer material and a suspension consisting of a liquid phase—a solution of sodium sulfate, and a solid phase—lead oxides, subjecting the suspension to separation, obtaining thereby lead oxide solids which are taken out of the process, and a solution of sodium sulfate, according to the invention, the solution of sodium sulfate is subjected to electrochemical treatment, obtaining thereby a solution of sulphuric acid, which is taken out of the process, and a solution of caustic alkali, which is fed for treatment of the lead-containing polymer material, obtaining thereby a polymer material with a reduced amount of lead, which material is taken out of the process, and an alkaline solution comprising sodium sulfate and sodium plumbate, which is fed into the reaction zone for treatment of the recyclable raw material.

Such a realization of the method improves the degree of recovery of lead from a recyclable raw material by treatment of its fractions—metallized lead, oxide-sulfate mass and polymer, with an alkaline NaOH solution with pH > 8, containing $Na_2PbO_2$ and $Na_2SO_4$. As a result of such treatment the metallized lead and polymer fractions are freed from the oxide-sulfate mass, which, after the raw material is crushed, covers the metallized lead and polymer fractions in a small amount, partially due to the chemical dissolving of the said mass in the alkaline solution, partially due to the mechanical interaction of the fractions. The purified metallized lead is taken out of the process and fed for remelting. During the remelting there is no possibility for the ingress of lead into the slag as lead sulfide (PbS). The amount of lead in the polymer fraction subjected to further treatment is reduced by 15-20%. As a result of further treatment of the polymer fraction with the NaOH alkaline solution the amount of lead therein is reduced by 75-85%. The method according to the invention requires less material expenditures because of the use of an alkaline solution in the process, obtained as a result of electrochemical treatment of a $Na_2SO_4$ solution, and because of the circulation of $Na^+$ in the solution in the process of lead recovery. During the realization of the method according to the invention, the emission of sulphur into the environment is reduced because of its utilization in sulphuric acid, used, for example, in the production of technical gypsum. Furthermore, the proposed method has reduced energetical consumption because such a step as evaporation of the $Na_2SO_4$ solution is not present.

It is advisable that the alkaline solution obtained after the electrochemical treatment of the sodium sulfate solution would have an NaOH concentration of 40–60 $g/dm^3$.

This ensures the necessary balance of water for the separation of the recyclable raw material into fractions. If the concentration of NaOH in the alkaline solution is less than 40 $g/dm^3$ the conditions for separation of the recyclable raw material into fractions are not satisfied and the degree of extraction of sulphur from the oxide-sulfate fraction is reduced. If the concentration of NaOH in the alkaline solution is greater than 60 $g/dm^3$ the conditions for separation of the recyclable raw material into fractions are not satisfied either and an increase in the recovery of lead from the polymer fraction does not take place.

It is recommended that during the treatment of the polymer material, comprising lead inclusions, with an NaOH solution, the weight relationship of the polymer material to the said solution would lie in the range of 1:(10–15).

The aforementioned weight relationship ensures the maximum degree of recovery of lead from the polymer fraction.

If the ratio of the solid phase to the liquid phase is less than 1:10 the degree of recovery of lead Pb from the polymer fraction is substantially reduced.

If the ratio of the solid phase to the liquid phase is greater than 1:15, then, in the first place, this does not result in an increase in the degree of recovery of lead Pb from the polymer fraction, and, in the second place, causes infringement of the conditions for separating the initial raw material into fractions.

BRIEF DESCRIPTION OF THE DRAWINGS

Other objects and advantages of the invention will become clearer from the following specific example of realization shown in the drawing, in which the sequence of steps of the method in accordance with the invention is schematically presented.

DETAILED DESCRIPTION OF THE INVENTION

Figure 1:
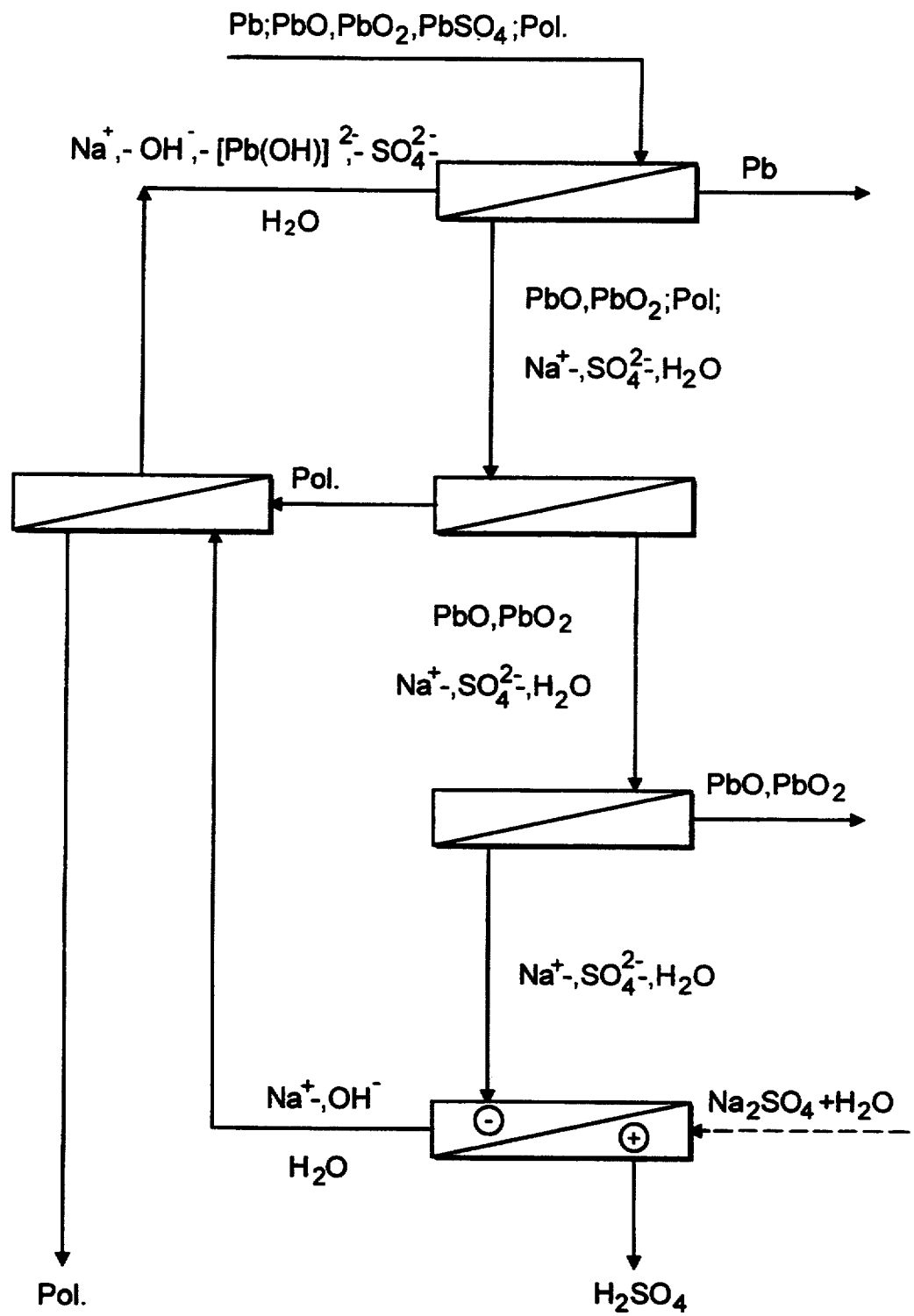

The method of recovering lead from a recyclable lead-containing raw material in accordance with the invention is realized in the following manner.

The recyclable raw material as spent lead-sulphuric acid storage batteries is fed for crushing, for example, to a hammer crusher. As a result of the crushing, crushed material is obtained having a size less than 30 mm, which is fed for separation into fractions—metallized lead, an oxide-sulfate mass and a polymer material. Separation into fractions is accomplished in a separator into which an alkaline solution of caustic alkali and the crushed material are fed. Wherein, a suspension is produced in the separator, the density of which is greater than the density of the polymer material and less than the density of the metallized lead. As a result of this step the metallized lead fraction settles, while the polymer material fraction rises to the surface of the suspension. Interaction between the alkali and the lead sulfate $PbSO_4$ of the oxide-sulfate mass takes place due to the presence of NaOH in the suspension. As a result of this the sulphur passes into the solution as sodium sulphate $Na_2SO_4$ and the metallized lead and partially the polymer material are released from the oxide-sulfate fraction. The purified metallized lead fraction is removed from the separator for remelting. The polymer material fraction together with the suspension are removed from the separator and fed onto a screen for separation. A polymer material fraction with particles having a size of at least 1 mm and a suspension, the liquid phase of which consists of an $Na_2SO_4$ solution, the solid phase of lead oxides—PbO and $PbO_2$, are obtained as a result of screening. The polymer material fraction containing lead Pb in an amount equal to 4–6% by weight is fed into a reaction zone for additional treatment with an alkaline solution.

The suspension is filtered, as a result of which a solid fraction of lead oxides PbO and $PbO_2$, which is taken out of the process in the reduction smelting, and a solution of sodium sulfate $Na_2SO_4$, are obtained. The liquid phase is subjected to electrochemical treatment, as a result of which a solution of sulphuric acid $H_2SO_4$, which is taken out of the process, and an alkaline solution NaOH with the concentration of the NaOH being 40–60 $g/dm^3$, are obtained. The alkaline solution obtained is fed for further treatment of the polymer material fraction, comprising lead as inclusions, where the weight relationship between the polymer material fraction and the alkaline solution is maintained within the limits of 1:(10–15). As a result of the additional treatment of the polymer material fraction with the alkaline solution the amount of lead therein is reduced by 75–80% with the amount remaining in the polymer material equal to 0.4–0.5%.

Then the polymer material fraction is separated from the alkaline solution comprising $Na_2PbO_2$, $Na_2SO_4$, which is fed for the step of separating the initial, preliminarily crushed recyclable raw material. The polymer fraction with the residual amount of lead being 0.4–0.5% is taken out of the process for subsequent utilization or burial.

In order to compensate for the loss of the alkali and water during realization of the method according to the invention, which loss occurs together with the products removed from the process, for example, lead, lead oxides and polymer material fraction, a sodium sulfate solution is additionally provided during the stage of electrochemical treatment of the sodium sulfate $Na_2SO_4$ salt solution.

The foregoing method of recovering lead from recycable raw material in accordance with the invention is characterized by reduced material and energetic consumption because of regeneration of the alkali obtained during electrochemical treatment of an $Na_2SO_4$ solution. The absence of the evaporation step in the method according to the invention makes it less energy consuming. Furthermore the proposed method is distinguished by the absence of the removal of technological solutions because of circulation of the liquid phase.

The invention is illustrated by the following example.

EXAMPLE

The initial raw material, spent storage batteries having a weight of 630 kg, are fed for crushing and 30 mm fractions are obtained which are fed for separation. This is accomplished in a suspension comprising an aqueous solution of sodium alkali, sodium plumbate and sodium sulfate, and a solid inclusion as $PbO$, $PbO_2$, $PbSO_4$. The density of the suspension 1.5–1.6 kg/$dm^3$ is maintained larger than the density of the polymer material fraction and less than the density of the metallized lead. As a result of the separation a metallic lead fraction having a weight of 333.9 kg and aqueous suspension, including a liquid phase—a sodium sulfate solution, and a solid phase—lead oxides and a polymer material (scrap of the bodies and isolating parts of storage batteries), are obtained. The metallic lead fraction is taken out of the process and fed for remelting in a liquid lead bath in order to produce antimonous lead. The suspension separated from the metallic lead is fed to the next separation stage where the polymer material fraction in an amount of 70.6 kg, in which there is 4.8% lead, is separated. The suspension without the polymer material fraction is fed for separation of the liquid and solid phases, for example, by filtering. The weight of the solid phase is 187 kg and it is composed of lead oxides with a small amount of sulfated sulphur. The lead oxides obtained are fed for reduction smelting with coke to produce pure lead. The liquid phase from the separation of the suspension, which is a solution of sodium sulfate, is fed for electrochemical treatment, as a result of which solutions of sulphuric acid and sodium alkali are obtained. The sulphuric acid solution is removed from the process while the sodium alkali solution is directed for further treatment of the earlier separated lead-containing polymer material fraction. Treatment of the polymer material fraction is conducted with an alkaline solution having a concentration of NaOH equal to 50 g/$dm^3$ with the ratio of the liquid phase to the solid phase being 12:1. As a result of treatment of the polymer material fraction with the alkaline solution the amount of lead in the latter was 0.43%. The polymer material fraction treated with the alkaline solution is separated from the solution washed with fresh water and removed from the process.

The weight of the polymer material fraction is 67.1 kg. The alkaline solution separated at that stage comprising sodium plumbate and sodium sulfate is fed for the separation of the crushed storage battery scrap and the process continues as described above.

It is evident from the presented example that there is no discharge and evaporation of solutions in the process for treatment of storage battery scrap, which eliminates the possibility for contamination of the environment. All the steps are conducted in a moist state and in an aqueous medium, which substantially reduces the emission of dust and the loss of lead together with the dust. The percentage of lead in the finished product recovered from the recyclable raw material is 97–98% when the process is conducted as described above. The regeneration of the alkaline solution as conducted in the foregoing example makes it possible to reduce its consumption by 85–90% and eliminate the consumption of heat for evaporation of the solution in order to obtain sodium sulfate.

We claim:

1. A method of recovering lead from a raw material containing metallic lead, lead oxides, lead sulfate and a polymer material with lead occlusions comprising:
   1) crushing the material,
   2) treating the crushed material with an alkaline solution comprising sodium hydroxide, sodium plumbate and sodium sulfate in a reaction zone to obtain a suspension of metallic lead and pulp, said pulp comprising a liquid phase of sodium sulfate solution and a solid phase, said solid phase comprising lead oxides and polymer material comprising lead occlusions,
   3) removing from the suspension the metallic lead,
   4) mechanically separating the pulp of step 2 to obtain the polymer comprising lead occlusions and a suspension of the sodium sulfate solution and the lead oxides;
   5) separating the suspension of step 4 to obtain the sodium sulfate solution and the lead oxides,
   6) removing the lead oxides from the suspension,
   7) treating the sodium sulfate solution of step 5 electrochemically to obtain sulfuric acid and sodium hydroxide,
   8) removing the sulfuric acid;
   9) treating the polymer material comprising lead occlusions of step 4 with the sodium hydroxide formed in step 7 to obtain a composition having a reduced amount of lead and an alkaline solution comprising sodium hydroxide, sodium plumbate and sodium sulfate,
   10) removing the composition having a reduced amount of lead, and
   11) feeding the alkaline solution of step 9 into the reaction zone for treating the crushed material.

2. A method according to claim 1 wherein additional sodium sulfate solution is added to the solution of step 7.

3. A method according to claim 1 wherein in step 9 the weight ratio of the polymer to the sodium hydroxide solution is 1:(10–15).

4. A method according to claim 1 wherein the concentration of sodium hydroxide obtained after treating the sodium sulfate solution of step 5 electrochemically is 40–60 g/$dm^3$.

* * * * *